United States Patent [19]

Delonge-Immik et al.

[11] Patent Number: 5,226,668
[45] Date of Patent: Jul. 13, 1993

[54] PRESSURE VESSEL FOR THE STORAGE OF A GAS HAVING AN OUTFLOW VALVE

[75] Inventors: Gudrun Delonge-Immik, Kornwestheim; Wolfgang Henseler, Tübingen; Wolf-Dietrich Münzel, Altdorf; Heinz Knoll, Stuttgart, all of Fed. Rep. of Germany

[73] Assignee: Mercedes-Benz AG, Fed. Rep. of Germany

[21] Appl. No.: 843,056

[22] Filed: Mar. 2, 1992

[30] Foreign Application Priority Data

Mar. 2, 1991 [DE] Fed. Rep. of Germany ....... 4106716

[51] Int. Cl.⁵ ............................................. B60R 21/26
[52] U.S. Cl. ...................................... 280/737; 222/3; 137/68.2
[58] Field of Search ............... 280/736, 737, 740, 741; 222/3, 541; 137/68.1, 68.2; 251/122

[56] References Cited

U.S. PATENT DOCUMENTS

| | | | |
|---|---|---|---|
| 2,712,881 | 7/1955 | Mathiser . | |
| 2,947,315 | 8/1960 | Connell | 137/68.1 |
| 3,905,515 | 9/1975 | Allemann | 222/3 |
| 3,910,596 | 10/1975 | Wulbrecht et al. | 280/735 |
| 3,960,390 | 6/1976 | Goetz | 280/731 |

FOREIGN PATENT DOCUMENTS

| | | | |
|---|---|---|---|
| 966529 | 4/1975 | Canada | 280/737 |
| 2228005 | 1/1973 | Fed. Rep. of Germany . | |
| 2348834 | 6/1974 | Fed. Rep. of Germany . | |
| 2118745 | 11/1979 | Fed. Rep. of Germany . | |
| 2136456 | 12/1972 | France . | |
| 2234160 | 1/1975 | France . | |
| 2243843 | 4/1975 | France . | |
| 743358 | 1/1956 | United Kingdom . | |
| 810540 | 3/1959 | United Kingdom . | |
| 1323273 | 7/1973 | United Kingdom . | |

Primary Examiner—Margaret A. Focarino
Assistant Examiner—Paul Dickson
Attorney, Agent, or Firm—Evenson, McKeown, Edwards & Lenahan

[57] ABSTRACT

A pressure vessel for storing a gas for use in airbag protection systems in passenger transport has an outflow valve connected to the housing of the pressure vessel at a predetermined breaking zone and contains a piston which extends to a pyrotechnic system arranged in the vessel interior. Influencing the outflow characteristic of the gas flowing out of a pressure vessel into an airbag in a controlled manner during the opening movement of the outflow valve is attained because the outflow valve contains a control body which adjoins the predetermined breaking zone and extends in the direction of the pyrotechnic system and the cross-section of which changes in the axial direction of the outflow valve.

4 Claims, 1 Drawing Sheet

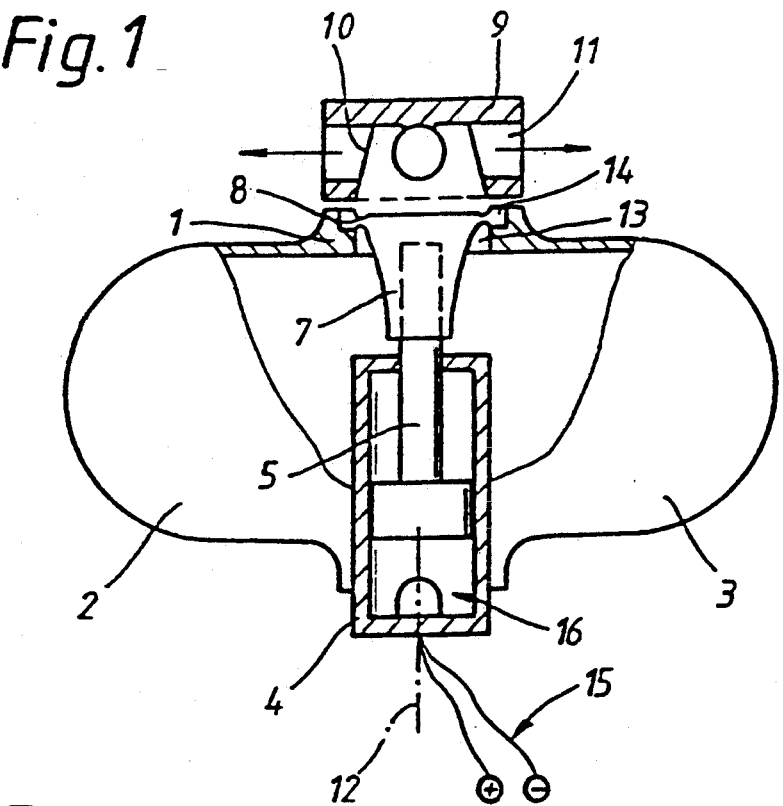
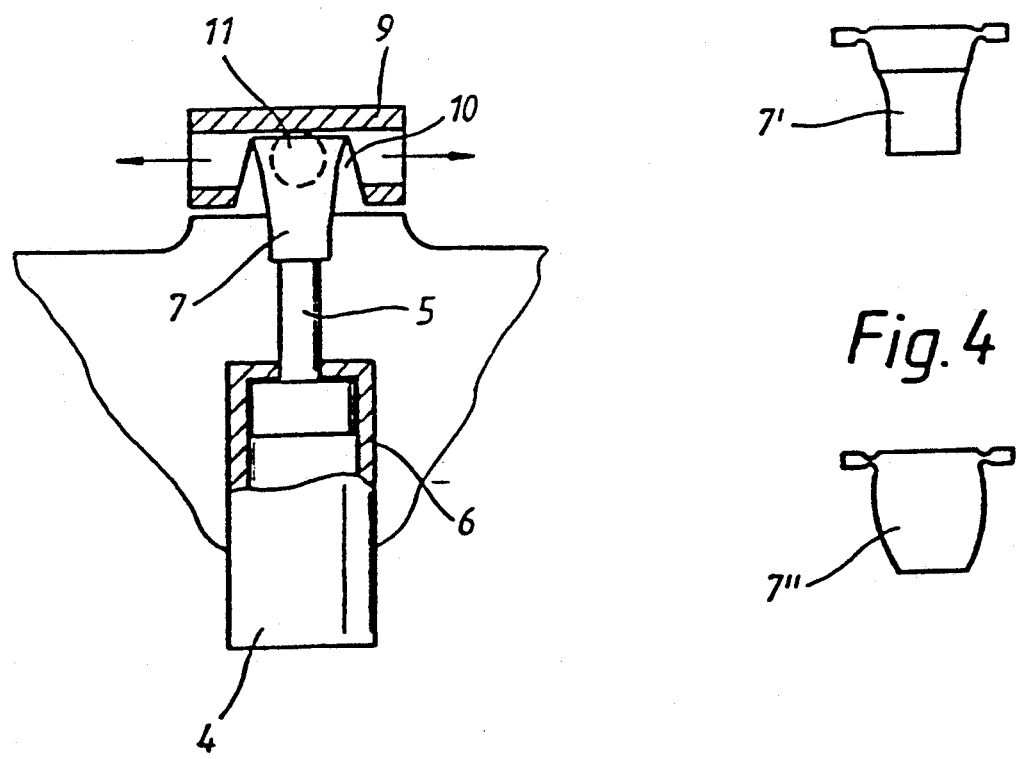

PRESSURE VESSEL FOR THE STORAGE OF A GAS HAVING AN OUTFLOW VALVE

CROSS-REFERENCE TO RELATED APPLICATION

This application is related to application Ser. No. 07/839,551 filed on Feb. 24, 1992, now U.S. Pat. No. 5,211,306.

BACKGROUND AND SUMMARY OF THE INVENTION

The present invention relates to a pressure vessel for storing a gas serving to inflate an airbag for the protection of occupants of a vehicle, and, more particularly, to a pressure vessel having an outflow valve connected to the pressure vessel housing at a predetermined breaking zone and containing a piston which extends to a pyrotechnic system arranged in the vessel interior and which, when the pyrotechnic system is ignited, pierces the predetermined breaking zone of the housing and opens an outflow orifice for the gas.

A pressure vessel is shown German Auslegeschrift No. 2,118,745 where an outflow valve is arranged in the interior. The pressure vessel and is equipped with a piston which projects into a gas generator integrated in the vessel interior and the other end of the piston is connected to the wall of the pressure vessel in the region of a predetermined breaking zone. The piston has a cylindrical shape. After the ignition of the gas generator, the piston presses the predetermined breaking zone of the wall of the pressure vessel outwardly and thus opens an outflow orifice for the gas stored in the pressure vessel. The predetermined breaking zone is circular, so that, when the cylindrical piston is extended, an annular outflow orifice for the gas is obtained. The cross-section of this outflow orifice does not change in the course of the axial movement of the piston as far as its end position.

An object of the present invention is to provide a pressure vessel in which the outflow characteristic of the outflow orifice can be influenced in a controlled manner even during the opening movement of the outflow valve.

This object has been achieved in accordance with the present invention by providing an outflow valve which contains a control body adjoining the predetermined breaking zone and extending in the direction of the pyrotechnic system, the cross-section of which body changes in the axial direction of the outflow valve.

The size of the outflow orifice, the outer edge of which is determined by the contour of the predetermined breaking zone, is thereby varied during the opening movement of the outflow valve. As a result, the outflow of gas from the pressure vessel into the airbag can be influenced in time even during the opening movement of the outflow valve. The shape of the control body makes it possible, for example, to prevent an overload of the airbag at the start of the outflow operation by a smooth onset of the outflow characteristic.

In one currently contemplated embodiment of the present invention, the control body tapers in the direction of the pyrotechnic system. With an increasing opening movement of the outflow valve, therefore, the outflow orifice of the pressure vessel becomes larger.

In yet a further embodiment of the present invention, the predetermined breaking zone has a circular predetermined breaking line, and the control body is made rotationally symmetrical. This provides an annular outflow orifice which guarantees uniform outflow conditions.

In a further embodiment of the invention, the control body is provided with an outer contour curved in longitudinal section. It is thereby possible to obtain even a complicated outflow characteristic, such as, for example, an S-shaped characteristic of the pressure trend over the outflow time.

In a still further embodiment, the outflow valve is followed outside the pressure vessel by a diffuser with an inner wall widening in the axial direction towards the outflow valve and which centers and fixes the control body in its position opening the outflow orifice of the pressure vessel. The outflow valve thereby acquires a specific end position which at the same time defines the maximum outflow cross-section of the outflow orifice.

BRIEF DESCRIPTION OF THE DRAWINGS

These and further objects, advantages and features of the present will become more readily apparent from the following detailed description of currently preferred embodiments when taken in conjunction with the accompanying drawings wherein:

FIG. 1 is a partially sectional schematic view of one embodiment of a pressure vessel according to the present invention in which are integrated a gas generator pyrotechnic system and an outflow valve connected thereto and containing a control body which is followed by a diffuser;

FIG. 2 is a cutaway view of the pressure vessel of FIG. 1 in which the outflow valve is shown in its end position opening the outflow orifice of the pressure vessel and centered by the diffuser;

FIG. 3 is an isolated view of one embodiment of a control body of the outflow valve shown in FIGS. 1 and 2; and FIG. 4 is an isolated view a further embodiment of a control body similar to that shown in FIG. 3.

DETAILED DESCRIPTION OF THE DRAWINGS

A gas, for example nitrogen, is stored under high pressure in a pressure vessel comprising parts 1, 2, 3 as shown in FIG. 1 and serves for inflation of an airbag for the protection of occupants of a vehicle. In the illustrated embodiment, the pressure vessel comprises a central valve carrier 1, to which two vessel shells 2, 3 are connected in a gas-tight manner. The pressure vessel 1, 2, 3 is relatively thin-walled and consists of a light metal, e.g. aluminum. The entire pressure vessel 1, 2, 3 is surrounded by a composite fiber winding (not shown) which reinforces the pressure vessel 1, 2, 3 to such an extent that it can store the gas at a pressure of 400 to 500 bar.

The central valve carrier 1, located at the top in FIG. 1, forms a hollow section part which is provided with an orifice 13 directed radially outwards and having a circular cross-section. On the side of the central valve carrier 1 located opposite the orifice 13 or facing into the pressure vessel, a gas generator 4 of a pyrotechnic system is fastened therein. The gas generator 4 has an essentially hollow-cylindrical shape and is welded in a gas-tight manner coaxially relative to the axis 12 of the orifice 13 into a corresponding recess of the valve carrier 1. Arranged on the bottom of the gas generator 4 is an igniter 16 equipped with a propellent charge and ignitable by an electrical circuit 15 which is closable in the event of an accident. A solid of a known type which, when ignited, generates a propellent gas serves, by way of example, as the propellent charge. Guided slidably in the gas generator 4 in the direction of the axis 12 is a piston 5 with a piston rod projecting upwardly through the housing of the gas generator 4 in the direction of the orifice 13. The gas generator 4 is sealed off hermetically, so that, although the piston 5 is axially moveable, nevertheless, in the event of the ignition of the igniter 16, no propellent gas can flow off into the interior of the pressure vessel 1 or into the environment.

Attached onto the piston rod of the piston 5 is a control body 7 which is configured rotationally symmetrical and which, in the position of rest of the piston 5 shown in FIG. 1, terminates in the region of the orifice 13 of the valve carrier 1. The control body 7 can also be formed as part of the piston rod of the piston 5. Formed on the upper edge of the control body 7 is a ring 14 which, in the region of the orifice 13, fits into a corresponding recess of the housing of the valve carrier 1 and is welded thereto in a gas-tight manner. Between the ring 14 and the control body 7 is located a circular predetermined breaking line 8, diameter corresponds approximately to that of the orifice 13. Starting from its upper end, the control body 7 tapers relative to the axis 12 in the direction of the gas generator 4 into the vessel interior. In the embodiment according to FIGS. 1 and 2, the control body 7 has, when viewed in longitudinal section, two sides with a concave outer contour.

In contrast thereto, the control body 7" according to the embodiment of FIG. 4 has a convex outer contour. The end of the control body 7" tapers relative to the axis 12 in the direction of the gas generator 4 into the vessel interior. The control body 7' shown in FIG. 3 is stepped and has, in its upper region, a frustoconically tapering outer contour which a cylindrical outer contour adjoins by way of a concavely rounded transition.

A diffuser 9 is arranged above the orifice 13 coaxially relative to the axis 12 of the outflow valve piston rod 5 and follows the outflow valve comprising the piston 5 and control body 7 to provide recoilless outflow and distribution into the airbag (not shown) of the gas flowing out of the pressure vessel 1, 2, 3. The diffuser 9 is opened towards the outflow valve 5, 7 by a frustoconical inner wall 10 concentric relative to the axis 12 and has four diametrically opposed cylindrical orifices 11 which are directed radially outwards and which guide the outflowing gas into the airbag. The frustoconical inner wall 10 widening towards the outflow valve 5, 7 is so configured that, during the opening operation described below, the inner wall 10 centers the control body 7 in the orifice 13 and fixes it in an end position opening a maximum outflow 5 orifice shown in FIG. 2.

As soon as, in the position of rest of the outflow valve 5, 7 shown in FIG. 1, the igniter 16 in the gas generator 4 is ignited and the propellent gas generated by the burning solid presses the piston 5 upwardly, the control body 7 of the outflow valve breaks off from the ring 14 along the predetermined breaking line 8. As a result, an annular outflow orifice is formed by the inner wall of the orifice 13 defined by the predetermined breaking line 8 and the outer contour of the control body 7. With the progressive movement of the control body 7 in the direction of the diffuser 9, the outflow orifice becomes larger until the upper edge of the control body 7 comes to bear against the frustoconical inner wall 10 of the diffuser 9 and is fixed there in a centered end position.

The size of the outflow orifice 13, therefore, changes constantly during the opening operation of the control body 7 and is always defined by the region of the outer contour of the control body 7 which at that particular moment is level with the predetermined breaking line 8 of the orifice 13. At the start of the opening movement, the outflow orifice 13 is relatively narrow because of the shape of the control body, and therefore the characteristic line of an outflow characteristic of the outflow orifice, which can be represented by a pressure/time diagram, initially rises at a low inclination. An overload of the airbag is thereby prevented. The control body 7 can be shaped such that, during the outflow operation, an S-shaped outflow characteristic is obtained in the pressure-time diagram. The centering of the control body 7 guarantees a uniform outflow of the gas through the outflow orifice 13 and through all four orifices 11 in the diffuser 9. Since the orifices 11 are located diametrically opposite one another, a recoilless outflow of the gas is obtained which is particularly advantageous due to the high pressures involved.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A pressure vessel for storage of a gas serving for inflation of an airbag to protect occupants in a vehicle, comprising an outflow valve connected to a pressure vessel housing at a predetermined breaking zone and containing a piston extending to an ignitable pyrotechnic system arranged in the vessel interior and which, when the pyrotechnic system is ignited, pierces the predetermined braking zone of the housing to open an outflow orifice for the gas, when the piston contains a control body which adjoins the predetermined breaking zone and extend towards the vessel interior, the cross-section of the control body changing in the direction of an axis of the piston to influence outflow characteristic of the gas, wherein the predetermined breaking zone has a circular predetermined breaking line, and the control body is rotationally symmetrical relative to the axis, wherein the control body has a curved convex outer contour as viewed in longitudinal section.

2. The pressure vessel according to claim 1, wherein a portion of the control body tapers in a direction toward the pyrotechnic system.

3. The pressure vessel according to claim 1, wherein a diffuser is provided downstream of the outflow valve and outside the pressure vessel, and has an inner wall widening in an axial direction towards the outflow valve which centers and fixes the control body in a position opening the outflow orifice of the pressure vessel.

4. The pressure vessel according to claim 3, wherein the diffuser has a plurality of diametrically opposed orifices directed radially outwardly.

* * * * *